United States Patent [19]
Vargas et al.

[11] Patent Number: 5,917,982
[45] Date of Patent: Jun. 29, 1999

[54] FIBER OPTIC CABLE CAPABLE METAL RACEWAY SYSTEM

[75] Inventors: Antonio J. Vargas, Tolland; Jeffrey D. Hemingway, Burlington, both of Conn.

[73] Assignee: The Wiremold Company, West Hartford, Conn.

[21] Appl. No.: 09/003,012

[22] Filed: Jan. 5, 1998

[51] Int. Cl.⁶ ........................................ G02B 6/00
[52] U.S. Cl. ............................. 385/134; 385/147
[58] Field of Search .................... 385/100, 134, 385/135, 136, 147, 133

[56] References Cited

U.S. PATENT DOCUMENTS

| | | |
|---|---|---|
| 4,743,088 | 5/1988 | Balyasny et al. ................... 385/136 |
| 4,995,688 | 2/1991 | Anton et al. ......................... 385/53 |
| 5,339,379 | 8/1994 | Kutsch et al. ...................... 385/135 |
| 5,515,472 | 5/1996 | Mullaney et al. ................... 385/136 |

*Primary Examiner*—Akm E. Ullah
*Attorney, Agent, or Firm*—McCormick, Paulding & Huber

[57] ABSTRACT

Two-piece metal raceway accommodates fiber optic cable at 90° corner assemblies that include curved side or back walls. The bend radius of these curved walls is two (2) inches or more, and these walls are also formed with stops to locate the raceway base, and to protect the cable from abrasion due to the raceway base flanges. Each corner assembly also includes a cover that anchors the raceway base to the corner assembly.

13 Claims, 10 Drawing Sheets

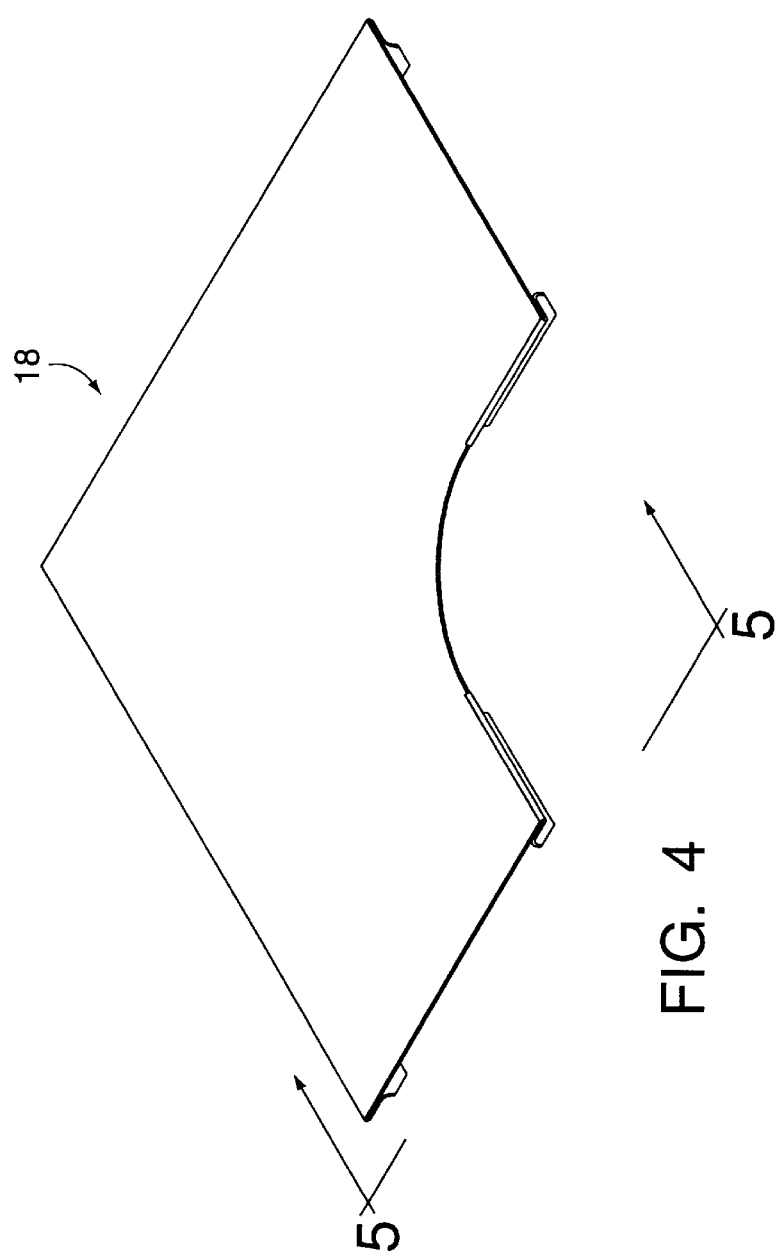

FIBER OPTIC CABLE CAPABLE METAL RACEWAY SYSTEM

This invention relates generally to surface mount electrical raceway systems of the type having a forwardly open metal channel-shaped base formed with longitudinally extending inturned flanges, and a generally flat cover provided with integrally formed flanges adapted to mate with the flanges in the base.

Although such raceway base and cover components have been used with various fittings such as flat elbow fittings, internal and external corner fittings, as well as tees, the use of such metal raceway components and fittings has not proved suitable for accommodating fiber optic cable. Such cable cannot accommodate a bend radius of less than 2 inches when pulled through a corner fitting of the type currently available in the prior art for such metal raceway base and cover configurations. Fiber optic cable can be damaged due to the relatively sharp bends required at these corner fittings.

The chief aim of the present invention is to provide a raceway system with fiber optic cable corner assemblies which are not only adapted for use with conventional raceway base and cover components, but which corner assemblies are capable of accommodating fiber optic cable with no more than a two inch radius bend. These corner assemblies are further designed to protect such fiber optic cable from the relatively sharp edges of the raceway base flanges that are provided for engagement with flanges on the cover to secure these conventional components in assembled relation.

SUMMARY OF THE INVENTION

In accordance with the present invention, a raceway system is provided for routing fiber optic cable along walls or ceilings in an environment that requires the cables to undergo bends of 90°. In its presently preferred form, the system includes conventional linear raceway base and cover components, with complementary shaped flanges to allow the cover to be mated or assembled with the raceway base. Raceway corner assemblies provide flat elbow connections for such flanged raceway components, as well as internal and external corners and tees.

A typical raceway corner assembly includes a base fitting having angularly related first and second ends that are compatible with the raceway base and cover. Each corner assembly further includes a cover fitting that mates with each corner assembly base fitting. The raceway corner assembly base fitting includes at least one curved sidewall having a bend radius of at least two inches. At least one integrally projecting abutment surface is provided adjacent each end of the curved sidewall for engaging the raceway base when assembled with the corner assembly base fitting. This abutment surface also acts as a protective guard for the fiber optic cable, when the cable is pulled through the interior of both the raceway and the 90° corner assembly.

In further accordance with the present invention, the interior of both the raceway and the corner assembly is divided into separate wireways. The raceway cover and base are equipped with conventional divider means. The corner assembly is also fitted with a divider wall that is shaped to a radius generally complementary to the curved side wall of the cover assembly. This divider wall has ears that are formed at right angle to its generally planar configuration so as to be inserted into slots provided for this purpose in the corner assembly back wall.

An important feature of the invention is that conventional linear raceway base is received on reduced cross-sectional areas of the corner assembly end portions. The corner assembly cover has flanges secured to the corner assembly base, and to the raceway base as well. Thus, the corner assembly cover mates with both the raceway base and the corner assembly base fitting providing a very secure assembly for all three components.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein:

FIG. 4 is a perspective view of the corner assembly cover used in the assembly of FIG. 2.

FIG. 5 is an end elevational view of the cover as taken on the line 5,5 of FIG. 4.

DETAILED DESCRIPTION

Figure 1:
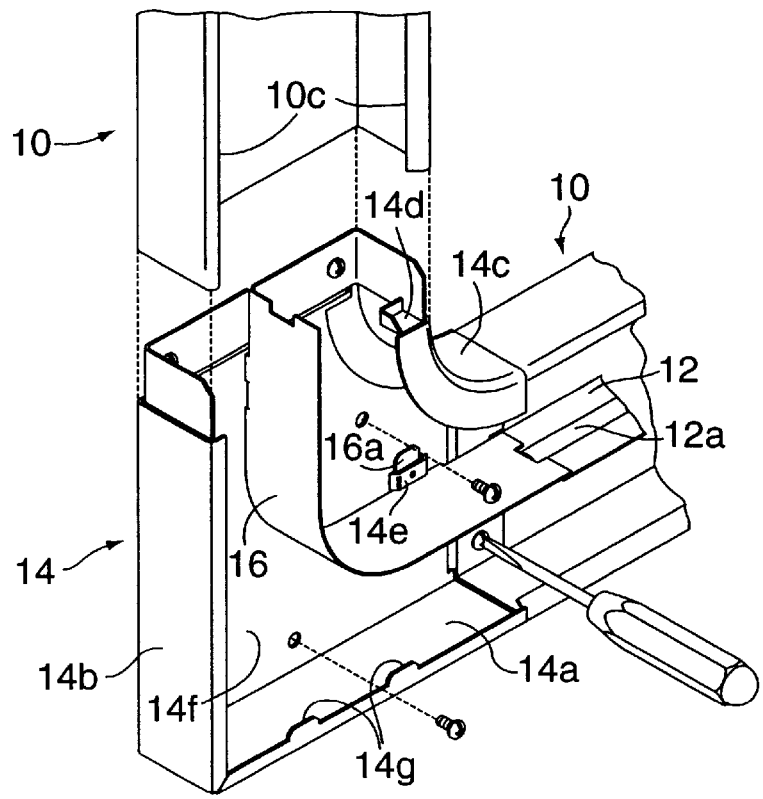
FIG. 1 is a perspective view of a flat elbow corner assembly in the process of assembly with a first raceway base, and a second raceway base which is oriented perpendicular to the first raceway base the latter being shown in exploded relation to another end of said corner assembly.

Turning now to the drawings in greater detail, FIG. 1 shows a flat elbow corner assembly base 14 constructed in accordance with the present invention, and assembled with two mutually perpendicular metal raceway base members, indicated generally at 10,10. It will be noted that one raceway base 10 is mounted vertically, and the other horizontally, the latter having a conventional divider strip 12 provided therein conventional clips (not shown) that fit within the channel-shaped raceway base and span the base back wall with end portions received inside the flanges 10c,10c.

With respect to the vertically oriented raceway 10, the broken lines show that the raceway 10 can be slid onto one end portion of the raceway corner assembly base fitting 14. The corner assembly base fitting 14 includes mutually perpendicular side walls 14a and 14b, which side walls are aligned with the side walls of the raceway base members 10, 10. These raceway base members 10,10 have inwardly formed flanges 10c,10c for receiving flanged raceway cover members 100,100 as shown in FIG. 2.

Figure 3:
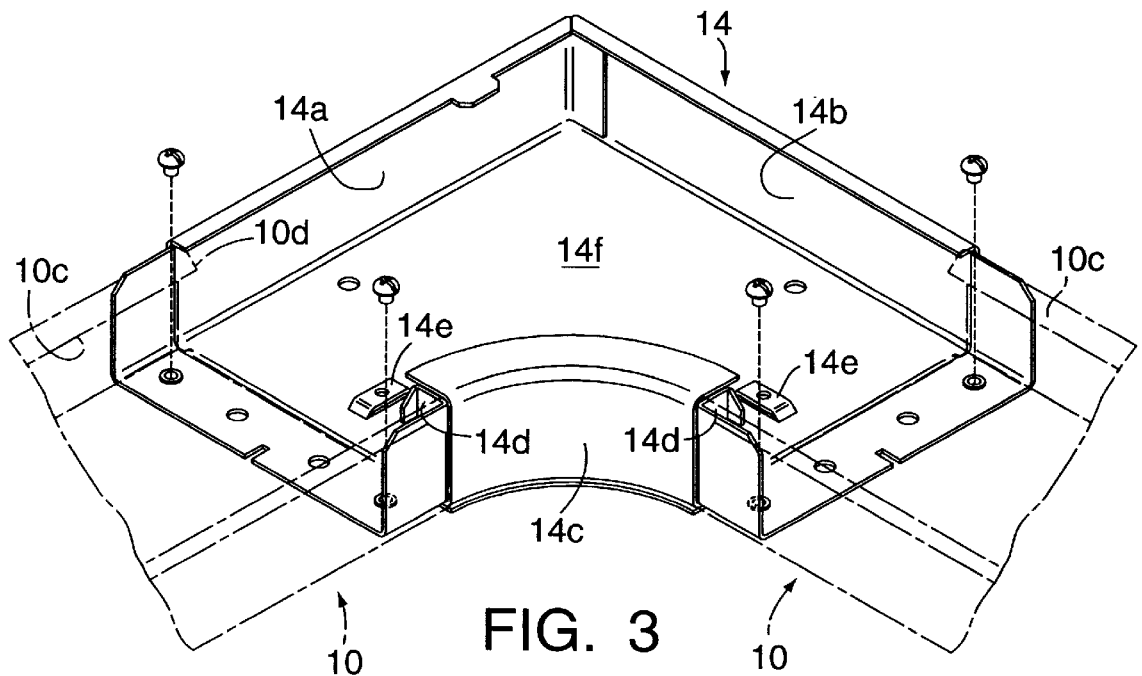
FIG. 3 is a perspective view of the flat elbow corner assembly base of FIG. 1.

It is a feature of the present invention that the corner assembly base 14 also includes a curved side wall 14c that is designed to have its end portions oriented tangentially to the opposite side walls of the raceway base members 10,10. As best shown in FIG. 3, the corner assembly base fitting 14 has first and second end portions adapted to mate with and slidably receive the raceway base 10. The raceway base 10 is illustrated in broken or phantom lines in FIG. 3 to better illustrate the sharp corners created by the raceway base flanges 10c, 10c. The location for these sharp corners 10d, is significant in that they overlap the cover assembly base 14. This corner assembly base 14 and more particularly the curved side wall 14c has abutment stops 14d defined at its ends that serve to locate the raceway base 10, and also serve to protect the fiber optic cable located in the interior of the raceway and the corner assembly, particularly when the fiber optic cable is pulled through the wireway defined between these components at assembly. This curved inside wall 14c has a bend radius of at least two (2) inches in order to protect the fiber optic cable from being bent too sharply, and thereby damaged.

Figure 6:
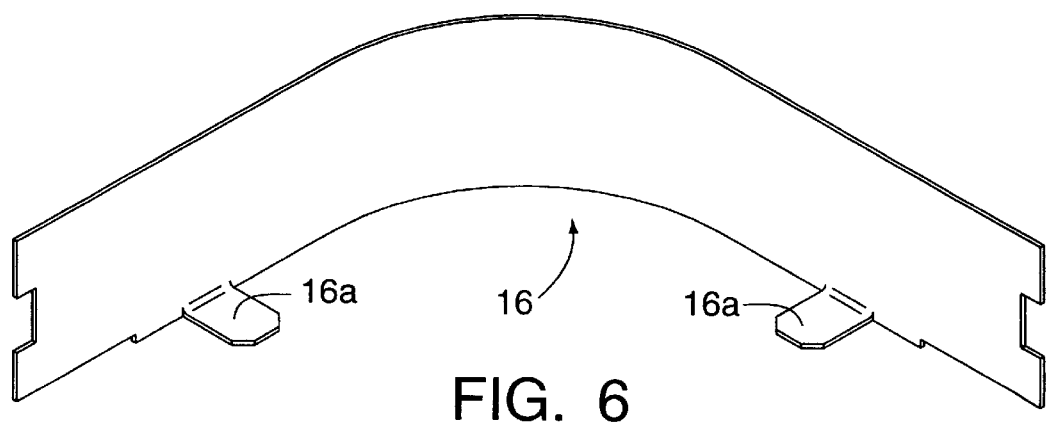
FIG. 6 is perspective view of the divider element utilized in the assembly of FIGS. 1 and 2.

Still with reference to FIG. 1, it will be apparent that the interior of the corner assembly can be divided into separate wireways as a result of a divider element 16. Ears 16a are provided at right angles to the curved or arcuate divider wall element 16 for entry in slots 14e defined by back wall 14f of the corner assembly 14 (see FIG. 6).

Figure 2:
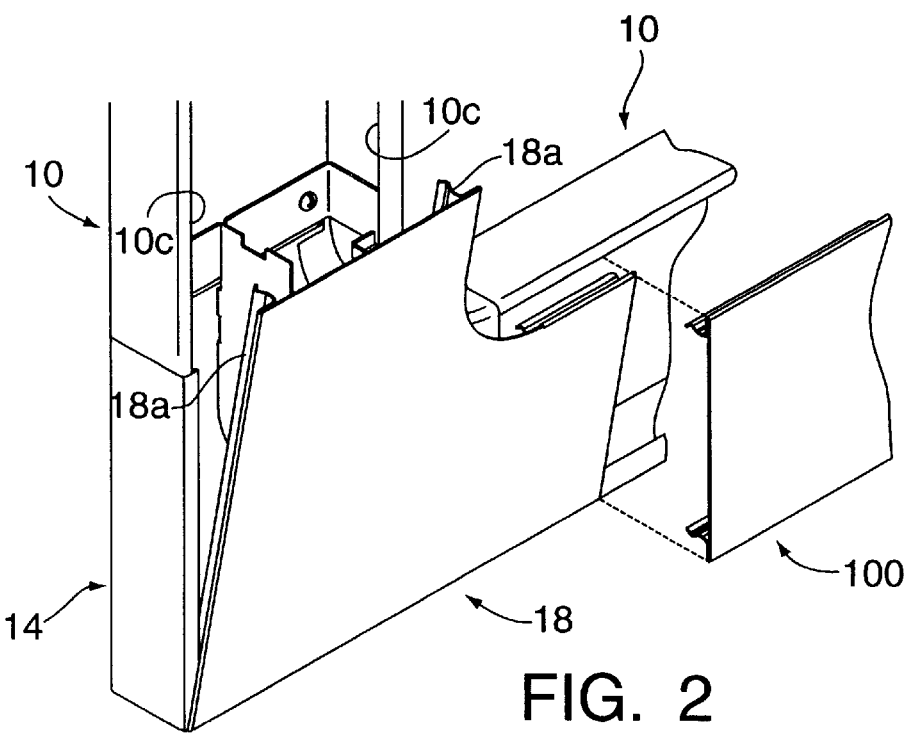
FIG. 2 shows the assembled components from FIG. 1, together with a corner assembly being secured to the components depicted in FIG. 3.

Turning now to FIG. 2, the corner assembly base fitting 14 and associated raceways 10, 10 are fitted with a unique corner assembly cover 18, shown in greater detail in FIG. 4. The cover 18 can be seen from the end view of FIG. 5 to have inwardly formed flanges 18a which are similar to the inwardly turned flanges provided on the conventional raceway cover 100. Along one linear edge of the corner assembly cover 18, slots are provided in this flange to receive tangs 14g in the corner assembly base fitting 14. One such opening in the corner assembly cover fitting flange is illustrated at 18b in FIG. 5. As so constructed and arranged, the flanged corner assembly cover fitting 18 is adapted to be snapped into place as suggested in FIG. 2. The cover 18 is of such a size that its flanges 18a engage the flanges 10c of the raceways base members 10,10. See FIG. 2 where the flanges 18a,18a can be seen to be so arranged as to engage the flanges 10c,10c of the vertically oriented raceway 10. As so constructed and arranged, the cover 18 serves to secure the corner assembly base fitting 14 to the raceways 10,10. Furthermore, the resulting curved configuration presents a very favorable appearance or design to the observer once installed on a wall or ceiling. The raceway covers 100 are of conventional construction as mentioned previously and abut the corner assembly cover 18 as suggested in FIG. 2.

Figure 7:
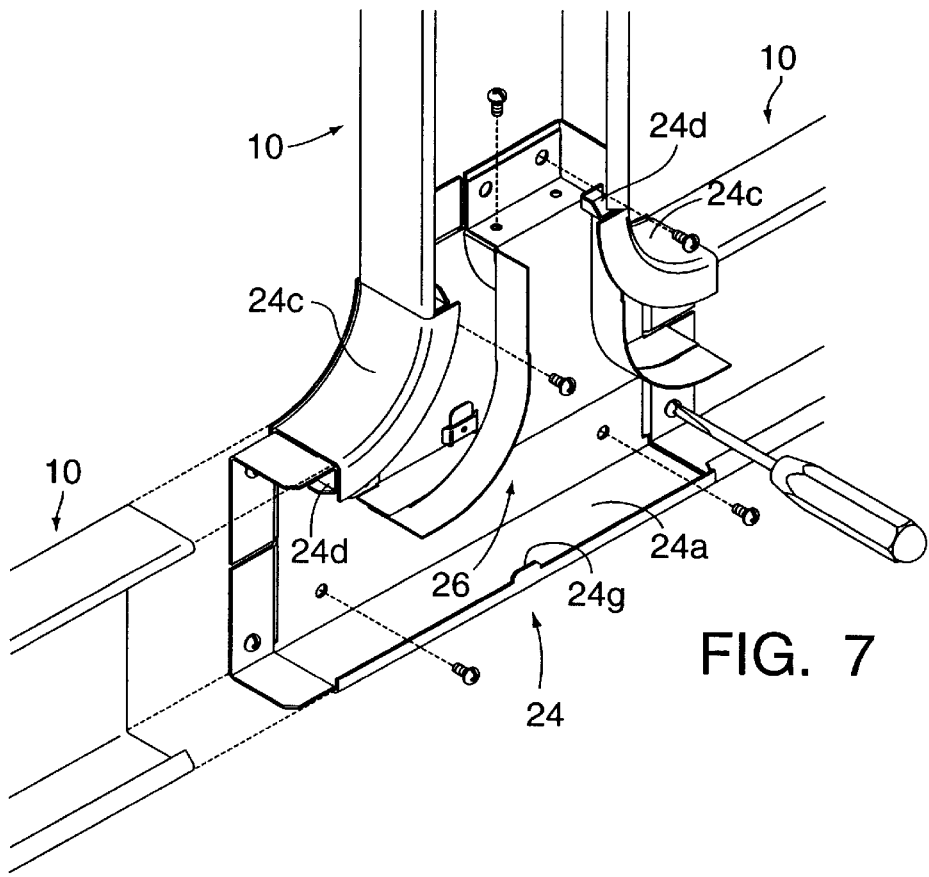
FIG. 7 is a view similar to that of FIG. 1, but illustrating an alternative embodiment of the present invention where the corner fitting is of tee shape and serves to provide the two mutually perpendicular raceways oriented on a flat surface and a third raceway provided at a third end portion of the tee-shaped corner fitting.

FIGS. 7, 8, 9, 10, 11 and 12 illustrate a corner assembly in the form of a tee capable of accommodating perpendicular raceway base members 10,10. Two horizontal raceway members are arranged at the top of the tee-shaped corner assembly. Another member 10 is perpendicular to these two. As in the previously described embodiment, the tee-shaped assembly corner includes a base fitting 24 that includes a portion which is identical to the flat corner assembly 14 of the previous embodiment. However, instead of mutually perpendicular walls 14a and 14b (See FIG. 1), the tee-shaped base fitting 24 is generally symmetrical so as to provide a third end portion for slidably receiving a third raceway base 10 as shown in FIG. 7. The corner assembly base fitting 24 includes two arcuate or curved side walls 24c,24c, and a single linearly extending side wall 24a that is aligned with the side walls of the horizontally extending raceway base member 10.

As in the previously described embodiment, the end portions of the corner assembly base fitting 24 are of reduced size so as to be slidably received inside the raceway base 10, and abutment stops 24d defined at the opposed ends of each curved side wall 24c engaged the inwardly turned flanges 10c of the raceway base 10 so as to protect the fiber optic cable (not shown) pulled through the corner assembly once it has been assembled with the raceway base.

Figure 9:
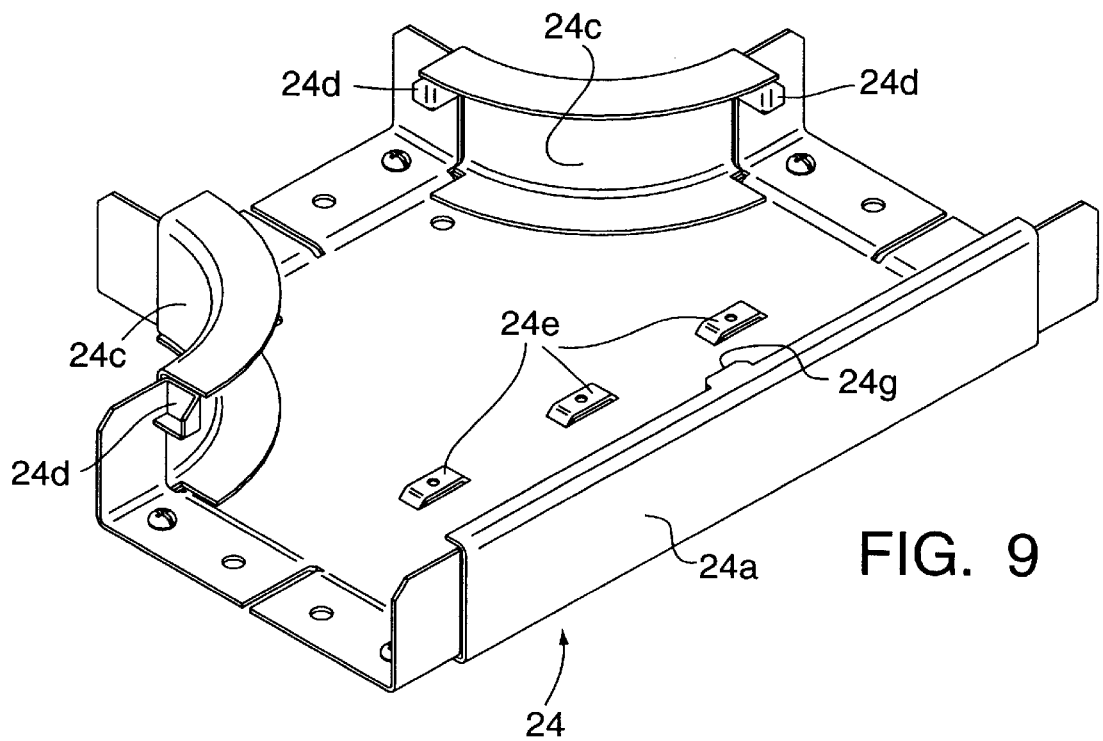
FIG. 9 is a perspective view of the corner assembly base fitting illustrated in FIGS. 7 and 8.

As best shown in FIG. 9, the tee shaped corner assembly base fitting 24 has a rear wall defining three (3) slotted openings 24e,24e, two (2) which are adapted to receive two ears that are provided for this purpose on the insert divider element 26 which serves to isolate the fiber optic cable from other wiring in the raceway. As mentioned previously, separate wireways are defined by conventional dividers in raceways, as shown at 12 with reference to the first embodiment. Such dividers are also provided in the raceways 10 of FIG. 7, with the result that divider element 26 of FIG. 7 is designed to divide the interior space of the corner assembly into at least two wireways for this purpose.

Figure 12:
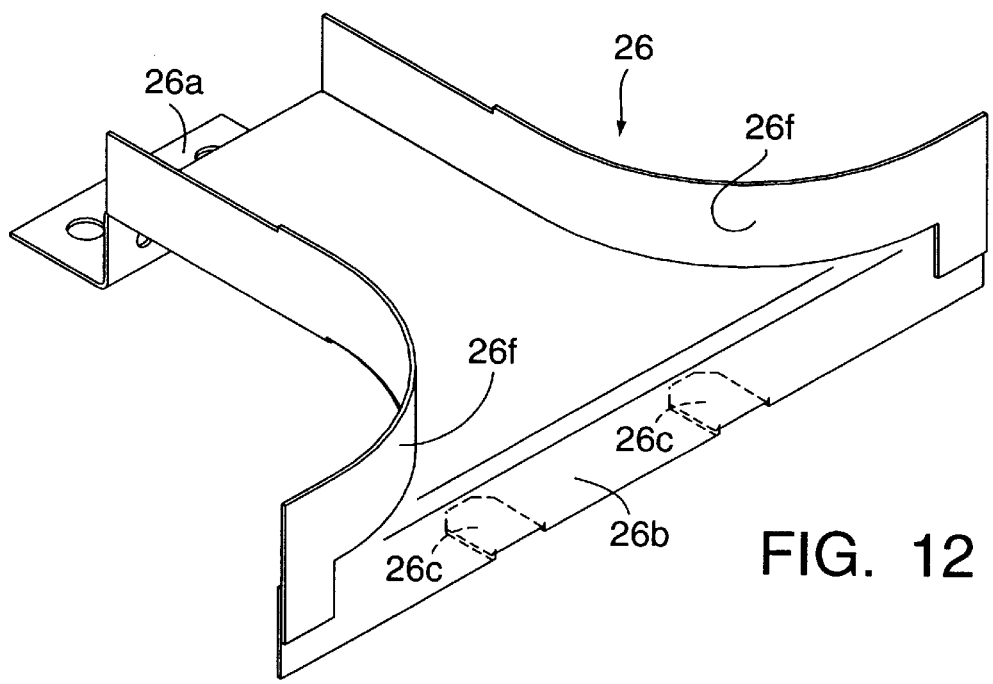
FIG. 12 is a perspective view of the divider element utilized in the assembly of FIGS. 7 and 8.

FIG. 12 illustrates the divider element 26 in greater detail, and shows that the top portion 26a defines an offset bracket for securing the divider element 26 in the open end of the vertically oriented raceway 10 of FIG. 7. An oppositely offset flange 26b at the lower end of the divider element 26 is provided with two (2) upwardly turned ears 26c. These two (2) ears 26c are selectively inserted in two of the three slotted openings 24e in order to provide different internal passageway geometries, or wireways, in the tee shaped corner assembly base 24. Still with reference to FIG. 12, the divider element 26 can be seen to have a funnel shaped configuration with opposed side walls 26f that are curved to define a funnel shape, and to provide a space behind the divider element 26 that serves to define a straight through passageway for cabling (not shown) extending horizontally between the horizontally aligned raceways 10,10 of FIG. 7.

Figure 8:
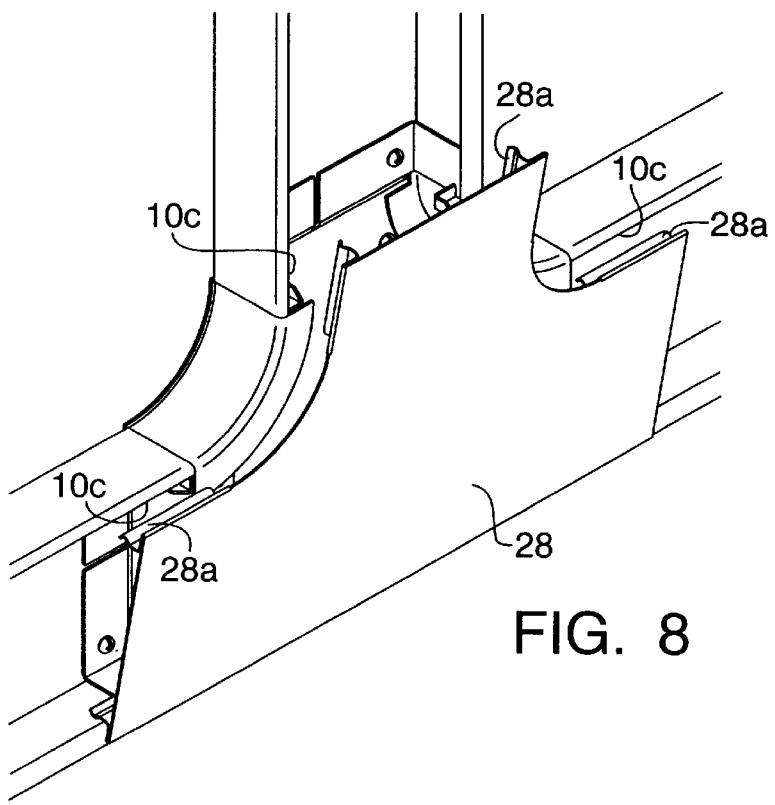
FIG. 8 is a view similar to FIG. 7, and also illustrates the corner assembly cover fitting being assembled with the base.
Figure 10:
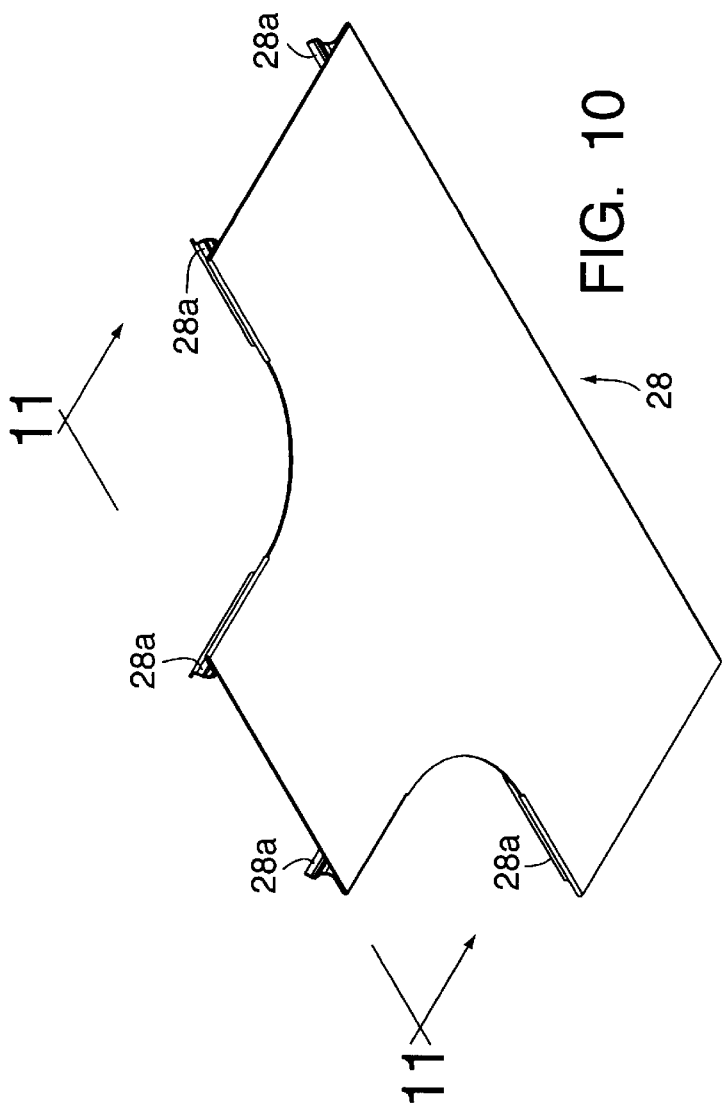
FIG. 10 is a perspective view of the corner assembly cover fitting as used in the assembly of FIGS. 7, 8 and 9.
Figure 11:
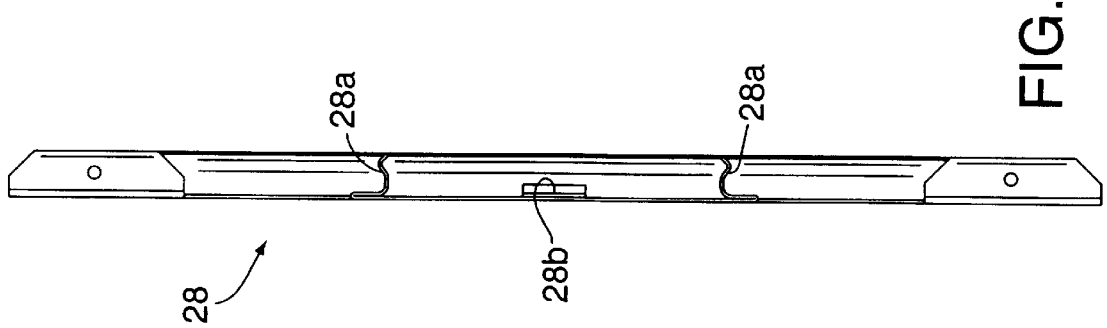
FIG. 11 is an elevational view taken generally on the line 11,11 of FIG. 10.
Figure 13:
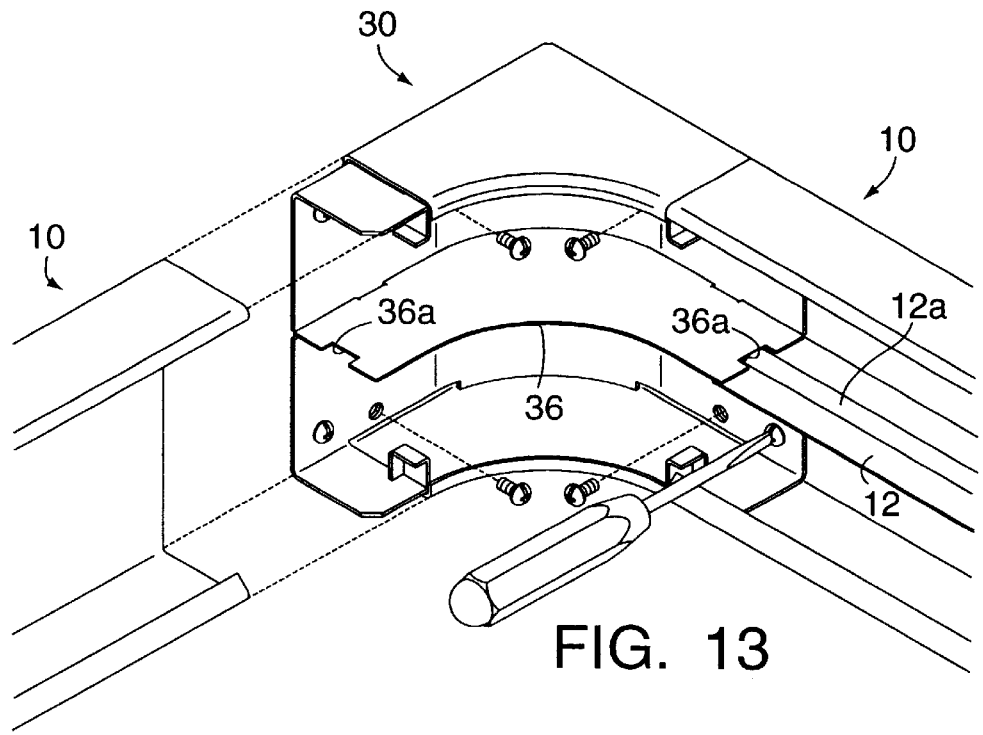
FIG. 13 is a perspective view illustrating an internal corner assembly for use in providing mutually perpendicular raceway base components at an internal corner.
Figure 14:
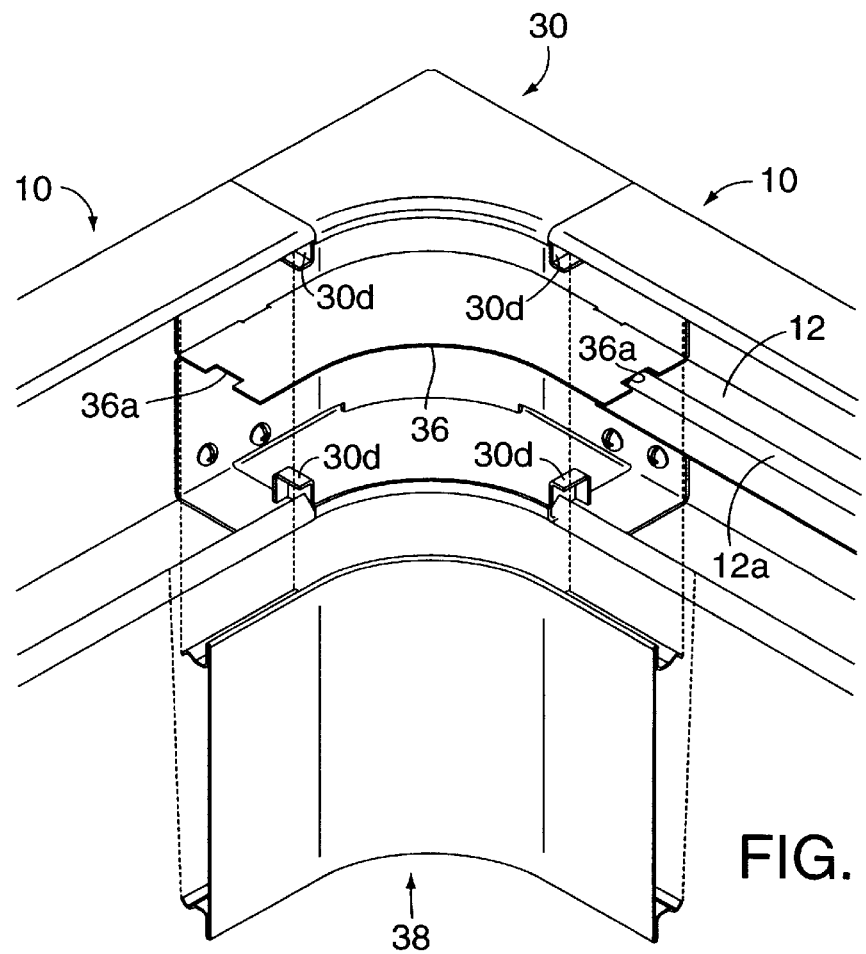
FIG. 14 is a view similar to FIG. 13, but illustrating a corner assembly cover in exploded relationship to the corner assembly base and mutually perpendicular raceway base components of FIG. 13.

FIG. 10 shows the corner assembly cover fitting 28 which is adapted to be received on the corner assembly base fitting 24 as suggested in FIG. 8. The tee shaped corner assembly cover fitting 28 is similar to the L-shaped cover 18 described previously with reference to the flat elbow corner assembly of FIGS. 1–6. Inwardly directed flanges 28a serve to engage the inwardly turned flanges 10c of the raceway base 10 in order to provide a secure assembly as between the various raceways 10,10, the corner assembly base fitting 24 and this tee shaped cover 28.

FIG. 8 shows the geometry of these components to best advantage and it will be apparent that the tee-shaped cover flanges 28a actually engage the inturned flanges 10c of the raceway 10. It should be noted that this tee-shaped corner assembly cover fitting 28 also includes an opening 28b best shown in FIG. 11 which is adapted to receive a tang 24g in the linearly oriented side wall 24a of the tee shaped base fitting 24.

Figure 15:
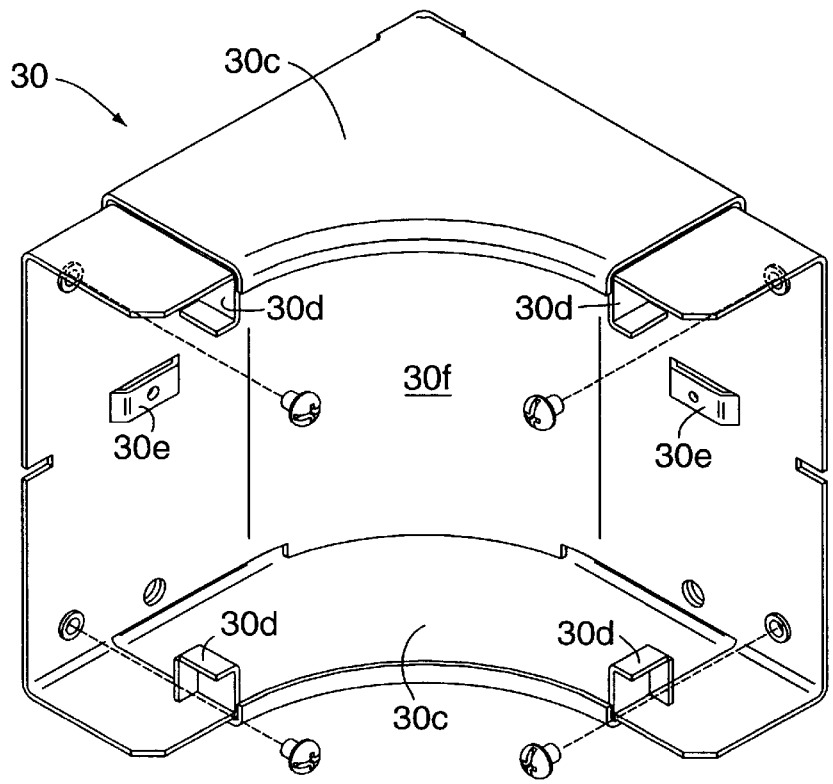
FIG. 15 is a perspective view showing in greater detail the construction of the corner assembly base of FIGS. 13 and 14.
Figure 16:
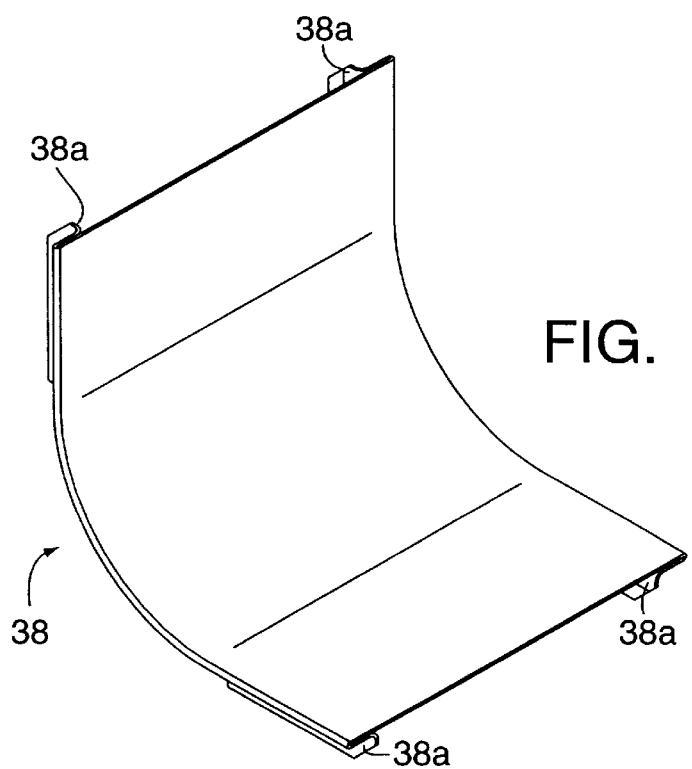
FIG. 16 shows in greater detail the construction of the internal corner assembly cover of FIG. 14.

Turning now to the embodiment of FIGS. 13 through 16 inclusively, two mutually perpendicular conventional raceway base members are indicated generally at 10, 10 and come together at an internal corner where they mate with an internal corner assembly base fitting indicated generally at 30. The corner assembly base fitting 30, like the above-described corner assembly base fitting 14 of FIG. 1, includes opposed end portions that are of reduced cross-section so as to slidably receive the open end of conventional raceway base 10. The corner assembly base fitting 30 is best shown in FIG. 15 where the curved side walls 30c can be seen to have abutment surfaces 30d defined at their ends for receiving and covering the sharp edges 10d of the turned in flanges 10c of the raceway base 10.

The back wall 30f of the channel-shaped interior of the corner assembly base fitting 30 provides an inner boundary for the wireway in the corner fitting and is curved with a radius of at least 2 (two) inches to safely accommodate fiber optic cable without undue bending of the cable. Slots 30e are provided in this back wall 30f to receive the ears of an arcuately shaped divider element 36 best shown in FIG. 13 for mounting the divider element so it is aligned with divider means 32 of conventional geometry provided in the raceway base 10 as described previously. The ends of the divider element 36 may be notched as shown at 36a to mate with a raised rib 12a such as normally provided in the conventional raceway divider means 12. See FIG. 1 for this feature. The corner assembly cover fitting 38 (best shown in FIG. 16) is assembled with the base fitting 30 and raceway base 10, 10 as suggested in FIG. 14 so that flanges 38a along the end portions of the cover 38 mate with the flanges 10c of the raceway base in the same manner as described previously with reference to the above-described covers of these embodiments. Conventional raceway cover members 100, 100 are assembled as described previously after so installing this cover 38.

Figure 17:
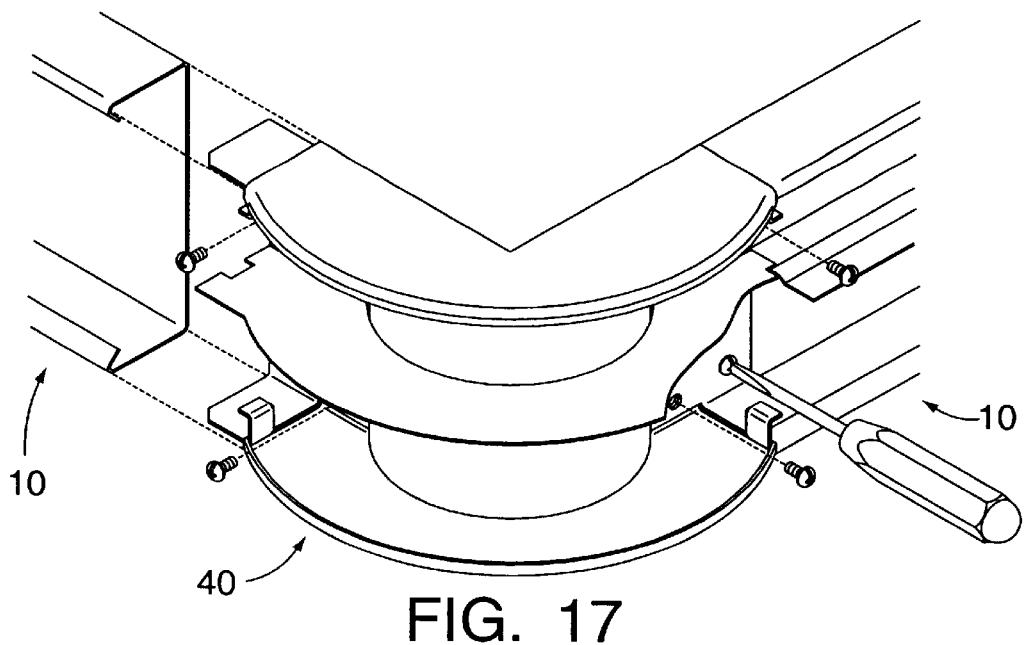
FIG. 17 shows another embodiment of the present invention suitable for use at an external corner, and this perspective view illustrates a cover assembly base together with a first raceway oriented perpendicular to a second raceway, the latter being shown in exploded relationship to the corner assembly base fitting.
Figure 18:
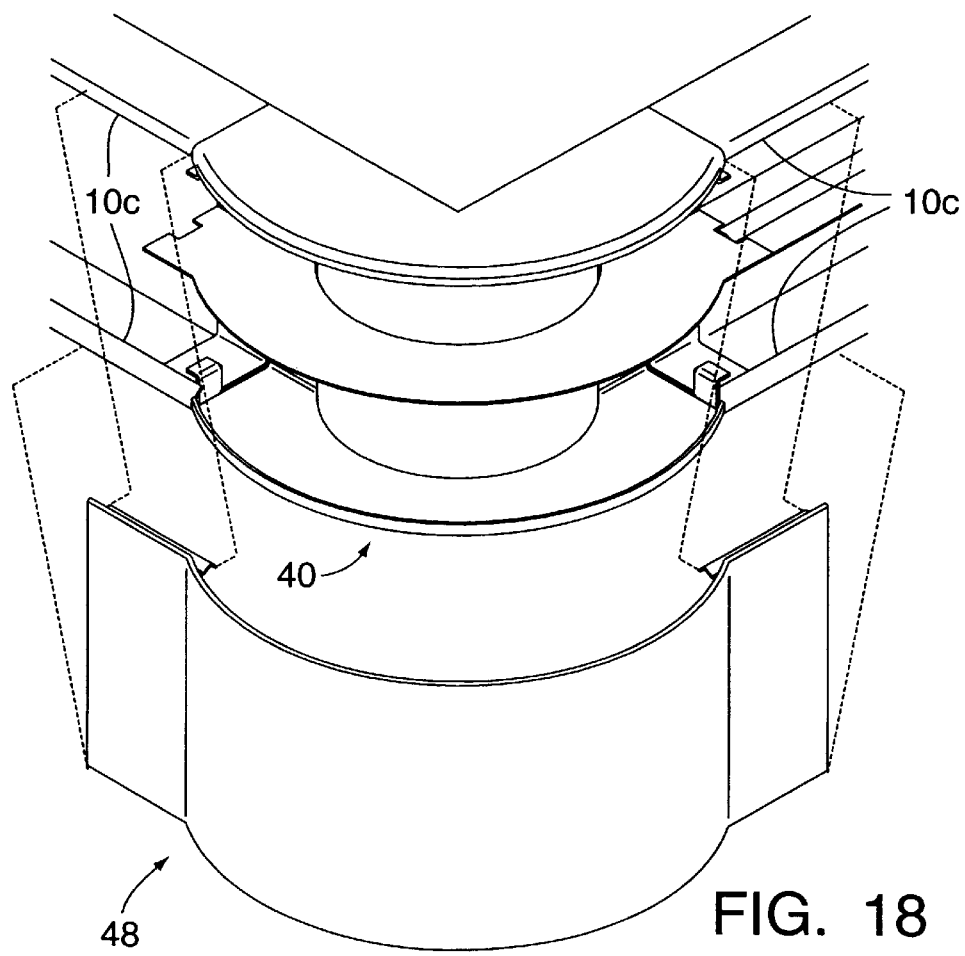
FIG. 18 is a view similar to FIG. 17, but illustrating a corner assembly cover provided in exploded relationship to the assembled components of FIG. 17.
Figure 19:
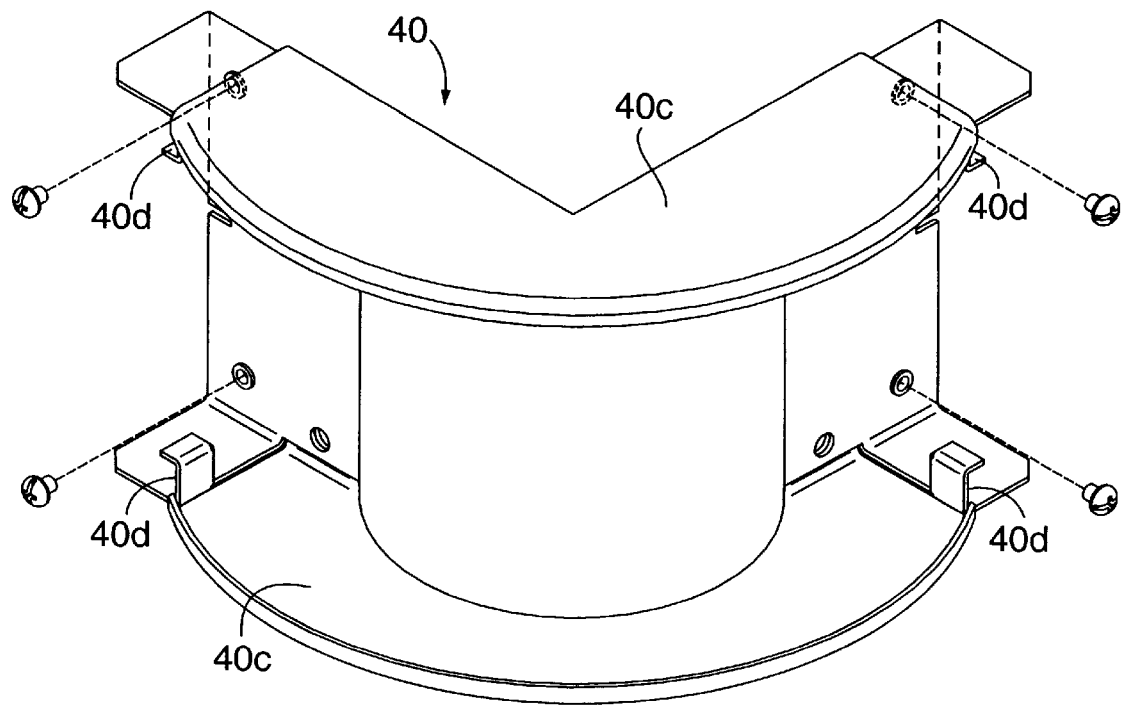
FIG. 19 shows in greater detail the configuration for the external corner assembly base of FIGS. 17 and 18.
Figure 20:
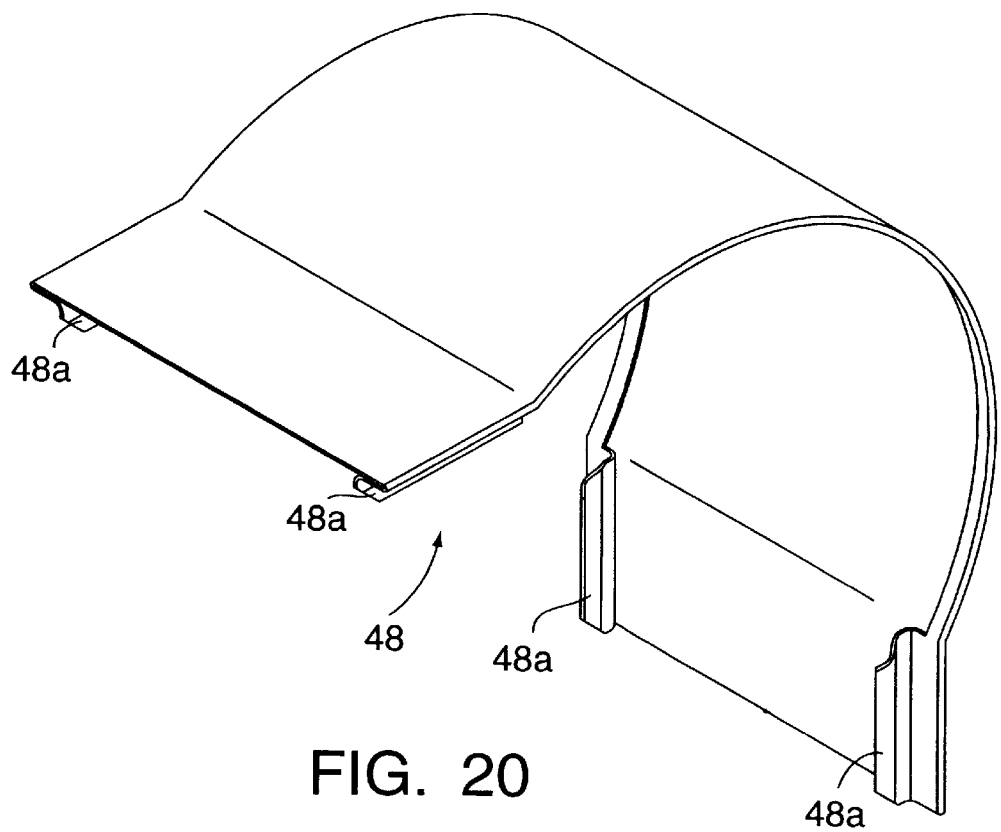
FIG. 20 shows in perspective the configuration of the external corner assembly cover, this view illustrating the configuration for the internal flanges of the corner assembly cover that mate with the raceway base to provide a relatively secure assembly for not only the corner assembly components, but also the conventional raceway base and cover components.

Turning next to the embodiment of the invention depicted in FIGS. 17 through 20 inclusively, a corner assembly suitable for use at an external corner is shown in FIG. 17. FIG. 19 shows the external corner assembly base fitting 40 in greater detail and illustrates the curved side walls 40c that include abutment surfaces 40d at their end portions to receive the inturned flanges 10c of the raceway base 10, and to also prevent these flanges, and more particularly their sharp edges 10d from interfering with the fiber optic cable placed in or pulled through the wireway defined between this base 40 and a cover 48, as suggested in FIG. 18. Mutually perpendicular raceway base members 10,10 are conveniently assembled with this external corner base fitting 40 by sliding the raceway 10 onto the opposed end portions of the base 40. The corner assembly cover 48 is applied to the end portions of the raceway base 10 and to the fitting 40 as best as shown in FIG. 18. The cover 48 has flanges 48a projecting rearwardly of the cover as shown in FIG. 20, which flanges 48a engage the flanges 10c of the raceway base 10 as well as those defined on the corner assembly base fitting 40.

We claim:

1. A raceway system for routing fiber optic cables along walls or ceilings that require the cables to undergo bends of 90°, said system comprising:

linear raceway base sections and linear raceway cover sections defining at least one wireway, said raceway base and cover sections having longitudinally extending flanges projecting inwardly into the wireway for engagement with one another to hold said raceway cover and base sections in assembled relation, a raceway corner assembly including a base fitting having angularly related first and second end portions for slidably receiving said raceway base sections, and a corner assembly cover fitting that mates with said corner assembly base fitting, said base fitting including a curved side wall between first and second end portions, said curved side wall defining at least one inwardly projecting abutment surface for engaging a raceway base section and its flange when said corner assembly base fitting is assembled with a raceway base section whereby said abutment surface acts as a guard to protect the fiber optic cable in the wireway defined in part by said raceway sections and in part by said corner assembly.

2. The system according to claim 1, wherein said corner assembly base fitting end portions are formed to fit inside said raceway base section, said corner assembly base fitting having a second side wall generally opposite said curved side wall, and said corner assembly base fitting having a back wall connecting said curved side wall and said second side wall, said back wall defining at least two slots, a divider element that is shaped to have a radius generally complementary to said curved side wall, said divider element having ears formed at right angles to the back wall of the corner assembly base fitting for insertion into said slots in said corner assembly back wall.

3. The system according to claim 2 further characterized by divider means in said raceway base, and said divider element aligned with said divider means at said corner assembly base fitting.

4. The system according to claim 1 wherein said corner assembly cover fitting has first and second ends overlapping said corner assembly base fitting first and second end portions respectfully, said first and second ends of said cover fitting having rearwardly projecting flanges similar to the flanges on said raceway cover, said raceway base flanges being received by said base fitting end portions and being engageable with said corner assembly cover fitting flanges so as to provide a secure assembly for said raceway base, said corner assembly base fitting, and said corner assembly cover fitting.

5. The system according to claim 4, wherein said corner assembly base fitting end portions are formed to fit inside said raceway base section, said corner assembly base fitting having a second side wall generally opposite said curved side wall, and said corner assembly base fitting having a back wall connecting said curved side wall and said second side wall, said back wall defining at least two slots, a divider element that is shaped to have a radius generally complementary to said curved side wall, said divider element having ears formed at right angles to the back wall of the corner assembly base fitting for insertion into said slots in said corner assembly back wall.

6. The system according to claim 4 further characterized by divider means in said raceway base, and said divider element being aligned with said divider means at said corner assembly base fitting.

7. The system according to claim 4, wherein said corner assembly base fitting back wall has an arcuate shape, said base fitting curved side wall and said base fitting second side wall having generally similar shapes and arranged perpendicularly with respect to said arcuate back wall to define a curved channel shaped interior wireway, and said back wall defining at least two slots, and a divider element shaped to have a radius generally complimentary to said curved side walls, said divider element having ears formed to fit in said slots in said back plate.

8. The system according to claim 3, wherein said corner assembly base fitting back wall has an arcuate shape, said base fitting curved side wall and said base fitting second side wall having generally similar shapes and arranged perpendicularly with respect to said arcuate back wall to define a curved channel shaped interior wireway, and said back wall defining at least two slots, and a divider element shaped to have a radius generally complimentary to said curved side walls, said divider element having ears formed to fit in said slots in said back plate.

9. The system according to claim 1, wherein said corner assembly base fitting second side wall is of planar configuration and oriented perpendicular to said second corner fitting end, a second raceway base on said second corner fitting end portion, a corner assembly cover fitting having a curved edge mating with said curved side wall of said cover assembly base fitting, and said corner assembly cover fitting further including a second side wall, said corner assembly base having a linear side wall with marginal edges defining at least one tang that is received in a slot provided therefor in said cover fitting linear edge.

10. The system according to claim 9, wherein said cover assembly base fitting has said first and second ends oriented for receiving two raceway base sections oriented perpendicular one another and said cover assembly base fitting further including a third end aligned with said first end to provide a tee, said second and third corner assembly base ends forming a mirror image of said second and first corner assembly base ends.

11. The system according to claim 1, wherein said curved side wall of said cover assembly base fitting has a radius of curvatures of at least approximately two (2) inches.

12. The system according to claim 5, wherein said arcuate back wall has a radius of curvature of at least approximately two (2) inches.

13. The system according to claim 7, wherein said arcuate back wall has a radius of curvature of at least approximately two (2) inches.

* * * * *